(12) United States Patent
Cave

(10) Patent No.: US 8,479,226 B1
(45) Date of Patent: Jul. 2, 2013

(54) METHODS AND APPARATUS TO IDENTIFY EXPOSURE TO 3D MEDIA PRESENTATIONS

(75) Inventor: Mark Richard Cave, Palm Harbor, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 0 days.

(21) Appl. No.: 13/401,551

(22) Filed: Feb. 21, 2012

(51) Int. Cl.
*H04H 60/32* (2008.01)

(52) U.S. Cl.
USPC .......... 725/19; 725/9; 725/12; 348/42; 348/51

(58) Field of Classification Search
USPC .................. 725/9, 12, 19; 348/42–60
See application file for complete search history.

(56) References Cited

U.S. PATENT DOCUMENTS

| | | | |
|---|---|---|---|
| 4,695,879 A | 9/1987 | Weinblatt | |
| 8,207,843 B2 | 6/2012 | Huston | |
| 2007/0046776 A1* | 3/2007 | Yamaguchi et al. | 348/53 |
| 2009/0315977 A1* | 12/2009 | Jung et al. | 348/42 |
| 2009/0322857 A1* | 12/2009 | Jacobs et al. | 348/42 |
| 2011/0188582 A1* | 8/2011 | Price | 375/240.26 |
| 2012/0026286 A1* | 2/2012 | Wang | 348/43 |
| 2012/0050498 A1* | 3/2012 | Jung et al. | 348/51 |
| 2012/0120208 A1* | 5/2012 | Mao | 348/54 |
| 2012/0140035 A1* | 6/2012 | Oh et al. | 348/43 |

OTHER PUBLICATIONS

Ramaswamy, Arun, "3D Television Monitoring Glasses", Published on Feb. 21, 2011 (2 pages).
U.S. Appl. No. 13/401,547, filed Feb. 21, 2012 (33 pages).
U.S. Appl. No. 13/401,489, filed Feb. 21, 2012 (56 pages).
U.S. Appl. No. 61/550,138, filed Oct. 21, 2011 (10 pages).

* cited by examiner

*Primary Examiner* — Pankaj Kumar
*Assistant Examiner* — Timothy Newlin
(74) *Attorney, Agent, or Firm* — Hanley, Flight & Zimmerman, LLC (57) ABSTRACT

Methods and apparatus to identify exposure to three dimensional media presentations are disclosed. An example method includes detecting a first brightness level with a first sensor and a second brightness level with a second sensor at a first time. A third brightness level is detected with the first sensor and a fourth brightness level is detected with the second sensor at a second time later than the first time. A 3D media counter is incremented when either: the first brightness is greater than the second brightness and the third brightness is less than the fourth brightness, or the first brightness is less than the second brightness and the third brightness is greater than the fourth brightness. The media is identified as 3D media when the 3D media counter exceeds a threshold.

19 Claims, 10 Drawing Sheets

METHODS AND APPARATUS TO IDENTIFY EXPOSURE TO 3D MEDIA PRESENTATIONS

FIELD OF THE DISCLOSURE

This disclosure relates generally to audience measurement, and, more particularly, to methods and apparatus to identify exposure to 3D media presentations.

BACKGROUND

Determining size and demographics of an audience to media (e.g., television, radio, movies, websites, Internet Protocol Television (IPTV), Video on Demand (VOD) media, advertisements, etc.) helps media providers (e.g., content creators, broadcasters, advertisers, etc.) to understand their audience and better tailor their offerings. Further, accurate media exposure demographics allow advertisers to target advertisements and/or media content to audiences of a desired size and/or audiences comprising members having a set of desired demographic characteristics (e.g., income level, lifestyles, interests, etc.)

DETAILED DESCRIPTION

Market adoption of three dimensional (3D) television (3DTV) is steadily increasing for home use. Media providers (e.g., content creators, broadcasters, advertisers, etc.) desire media exposure demographics to determine the scope and reach of their media. Media exposure demographics may include, for example, an identification of the person and/or the demographics of persons in an audience for particular media and/or a determination of how the media is presented (e.g., in two dimensions, in three dimensions, etc.). Determining the media exposure demographics enables the media providers to better tailor their media and facilitates pricing of advertisements, etc.

To collect demographics of audiences, an audience measurement entity may enlist a number of media utilizing households and/or consumers (e.g., panelists) to cooperate in an audience measurement study for a (closed or open-ended) period of time. The media usage habits of these panelists, as well as demographic data about these panelists, are collected using automated and/or manual collection methods. The collected data is subsequently used to generate statistics related to media exposure, including, for example, audience sizes, audience demographics, audience preferences, the total number of hours of media exposure per audience member and/or per region, program ratings, audience exposure, etc. Panelists may or may not be provided rewards to encourage participation in the panel; depending on the nature of the study.

Three dimensional sight is achieved when each eye of a viewer receives a separate image representing a different perspective of view. The two images are interpreted in the human brain to simulate a depth of field. To provide two separate images, one to each eye of the viewer, some 3D televisions display two separate images while the viewer wears a 3D viewing device (e.g., 3D glasses) that restricts each image to a separate eye.

Two primary methods of providing separate images to each eye are commonly used in commercial 3D television sets. Active 3DTV successively displays each image (e.g., a first image is displayed to a first eye of the viewer at a first time, and a second image is displayed to a second eye of the viewer at a second time). To achieve this effect, the active 3D television sends a control signal to the viewing device causing a first lens to block transmission of the first image and a second lens to block transmission of the second image by actively shuttering the first and second lenses. As a result, the images displayed on the 3D television are synchronized with the 3D viewing device to present different images to different eyes. In some examples, the control signal is an infrared control signal, a wireless control signal, a Bluetooth control signal, etc. When two dimensional media is displayed, the 3DTV does not transmit the control signal. When the 3D viewing device does not receive the control signal, both lenses allow the image to pass through simultaneously.

Passive 3D television, on the other hand, displays each image with alternating perpendicular polarizations. The first image is displayed with a first polarization (e.g., a horizontal polarization) and the second image is displayed with a second polarization that is perpendicular to the first polarization (e.g., a vertical polarization). The images are displayed at different times (e.g., in successive frames) on the 3D television. The viewing device (e.g., 3D glasses) used with passive 3D television systems has a first lens oriented in the first polarization and a second lens oriented in the second polarization. Thus, the first image is displayed through the first lens. The second image is displayed through the second lens.

Media that is broadcast in three dimensions is not always displayed in three dimensions. For example, some televisions may receive three dimensional media and render the media in two dimensions. Further, some televisions may receive two dimensional media and display the received media as three dimensional media. Thus, simply determining which media was broadcast, or even determining whether the media was broadcast in two or three dimensions does not provide an accurate reading of how the media was actually displayed to an audience.

In examples disclosed herein, a three dimensional sensing device is employed in an audience measurement system to enable the audience measurement system to determine when three dimensional media is being presented by a passive 3D television. In the illustrated example, the three dimensional sensing device includes two sensors and two respectively polarized lenses for use with a passive 3DTV.

Figure 1:
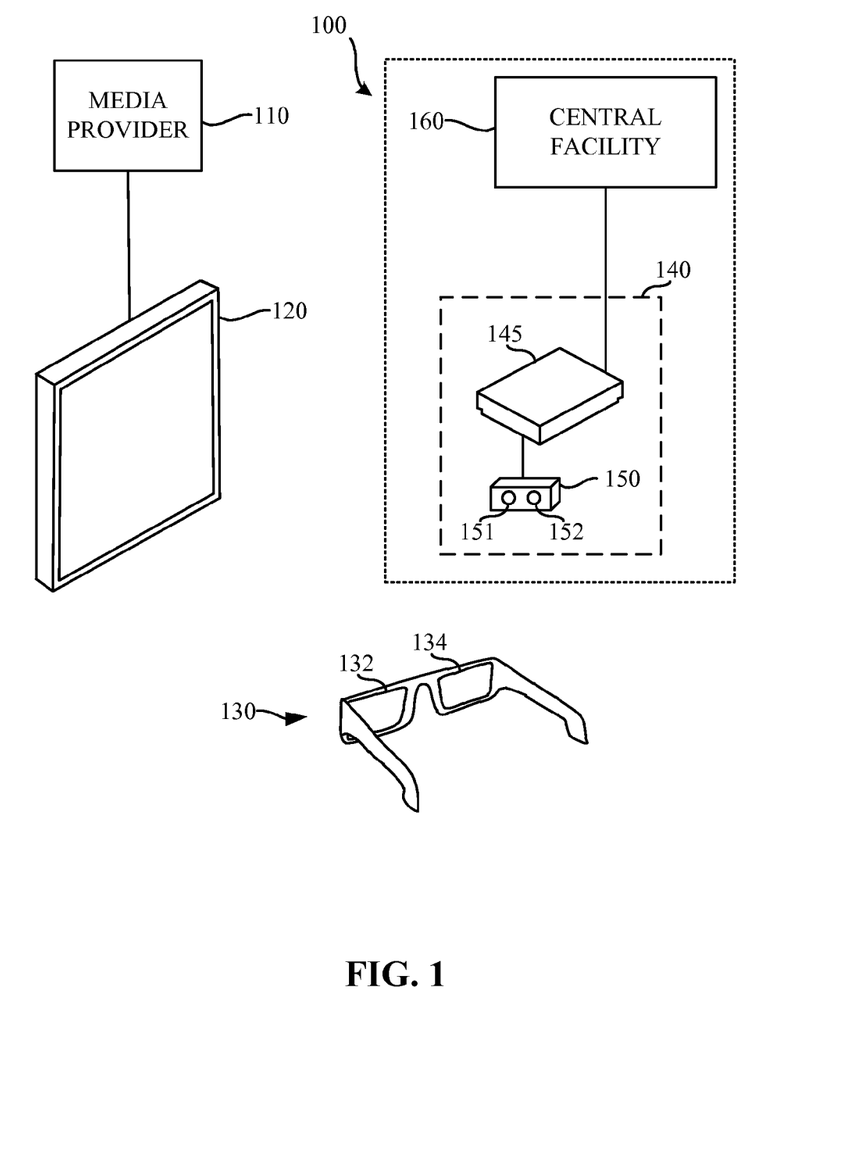
FIG. 1 is a diagram of an example system for identifying exposure to 3D media presentations.

FIG. 1 is a diagram of an example system 100 for identifying exposure to 3D media presentations. The example system 100 of FIG. 1 is adapted to monitor media provided by a media provider 110 to a 3D television 120 for display to a user via a passive 3D viewing device 130 (e.g., 3D glasses). The example system 100 includes a metering system 140, and a central facility 160 of an audience measurement entity. The example metering system 140 includes an audience measurement metering device 145 (e.g., a home unit) that aggregates monitoring data for transmission back to the central facility 160. In some examples, the metering device 145 is a software meter which executes on the set top box to collect data of interest. In the illustrated example, the metering system 140 is a standalone meter 145 and a 3D display sensor 150.

The example media provider 110 of FIG. 1 is a broadcast media provider (e.g., a satellite television provider, a cable television provider, an Internet Protocol Television (IPTV) provider, etc.). In the illustrated example, the media provider 110 provides media (e.g., content, advertisements, etc.) such that it can be displayed via a 3D presentation device (e.g., a 3D television). However, in some examples, the content provider 110 may not transmit the media via broadcast. For example, the media may be transmitted to the 3D presentation device by streaming (e.g., pointcast, Internet streaming, local network streaming, etc.), by physical media (e.g., DVD, Blu-Ray, etc.), or by any other method of transferring media (e.g., via an optical disk, via an adapter, etc.).

The example 3D television 120 of FIG. 1 is a passive 3D television. The example 3D television 120 alternates display of two images having alternating perpendicular polarizations (e.g., a first image has a first polarization, a second image has second polarization perpendicular to the first polarization, a third image has the first polarization, a fourth image has the second polarization, etc.). In the illustrated example of FIG. 1, the example 3D viewing device 130 is a pair of passive 3D glasses. In such an example, the 3D viewing device 130 includes a left lens 132 that is polarized in a first direction and a right lens 134 that is polarized in a second direction. The second direction is perpendicular to the first direction. When worn by the viewer, the left lens 132 is placed over the left eye and the right lens 134 is placed over the right eye.

In the illustrated example, the metering device 145 is a stand-alone device dedicated to collecting audience measurement data. However, the metering device 145 may be integrated into a device having an additional function (e.g., into a set top box to tune cable or satellite programming, into a gaming console, etc.). The example metering device 145 of FIG. 1 provides collected media exposure, presentation, consumption, tuning, people metering (e.g., data identifying audience members), and/or demographic data to the central facility 160 of an audience measurement entity. The example central facility 160 of FIG. 1 processes and/or stores the audience measurement data received from the metering device 145 along with data received from other such devices 145 (not shown), to produce ratings information and/or to develop media exposure statistics. For instance, the example central facility 160 of the audience measurement entity can determine what media is being displayed in 3D, what person or types of persons (e.g., what demographics) were exposed to the 3D media presentations, etc. In some examples, the metering device 145 stores a log of audience measurement data and periodically (e.g., once a day) and/or aperiodically (e.g., upon occurrence of one or more events and/or conditions) sends the collected data to the central facility 160 for processing. In other examples, the audience measurement data is sent (e.g., streamed) in substantially real time.

As described above, some televisions, 3D or otherwise, may receive 3D media and render the media in 2D. Likewise, some 3D televisions receive media in 2D and render the media in 3D. Thus, classifying the media as 3D or 2D based on the format in which the media is provided to the television does not provide accurate 3D media exposure metrics. In the illustrated example, the 3D display sensor 150 is used in conjunction with the metering device 145 to determine when media is actually being displayed in 3D.

The 3D display sensor 150 of the illustrated example includes two apertures 151, 152. Each aperture 151, 152 includes a polarized lens. In the illustrated example, the lens of each aperture is a polarized filter. Further, in the illustrated example, each lens is approximately a planar surface and positioned approximately within a same (i.e., one) plane (e.g., the lenses are aligned in a planar fashion). The lens of the first aperture 151 is perpendicularly polarized with respect to the lens of the second aperture 152. Behind each aperture is a light sensor capable of receiving the image displayed by the 3D television 120. By comparing the data collected by the sensors, the 3D display sensor determines whether the 3D television 120 is displaying 3D media. Because the 3D sensor 150 can detect when 3D media is being displayed when facing the 3D television, the 3D display sensor 150 is aligned such that the apertures 151 and 152 are generally facing a direction of the front (i.e., the display) of the 3D television 120.

Figure 2:
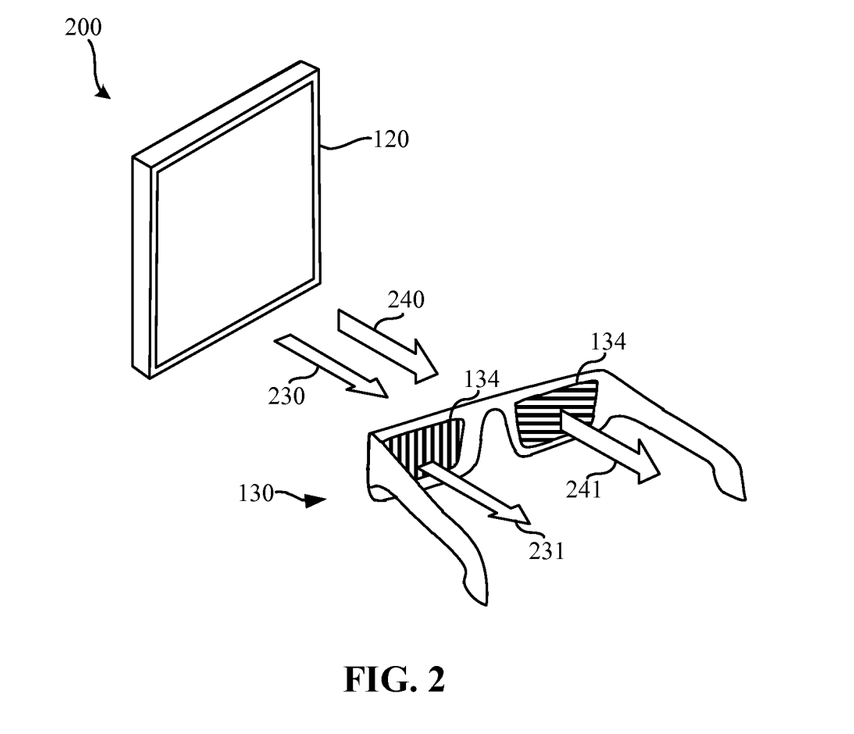
FIG. 2 is a diagram of an example passive 3D television and an example 3D viewing device of FIG. 1.

FIG. 2 is a diagram of an example passive 3D television 120 and 3D viewing device 130. FIG. 2 shows the 3D television 120 transmitting two images having perpendicular polarizations 230, 240. The 3D viewing device 130 includes a first lens 132 and a second lens 134. The first lens 132 and the second lens 134 are perpendicularly polarized. When worn by a viewer, the first lens 132 is associated with a left eye of the viewer, while the second lens 134 is associated with a right eye of the viewer. The lenses do not pass images that have a polarization perpendicular to their direction of polarization. When the 3D television is viewed through the passive 3D viewing device 130, the left eye of the viewer receives a first image 231 having a first polarization while the second eye of the viewer receives a second image 241 having a second polarization that is perpendicular to the first polarization. By receiving a separate image at each eye, a depth of field is simulated.

Figure 3:
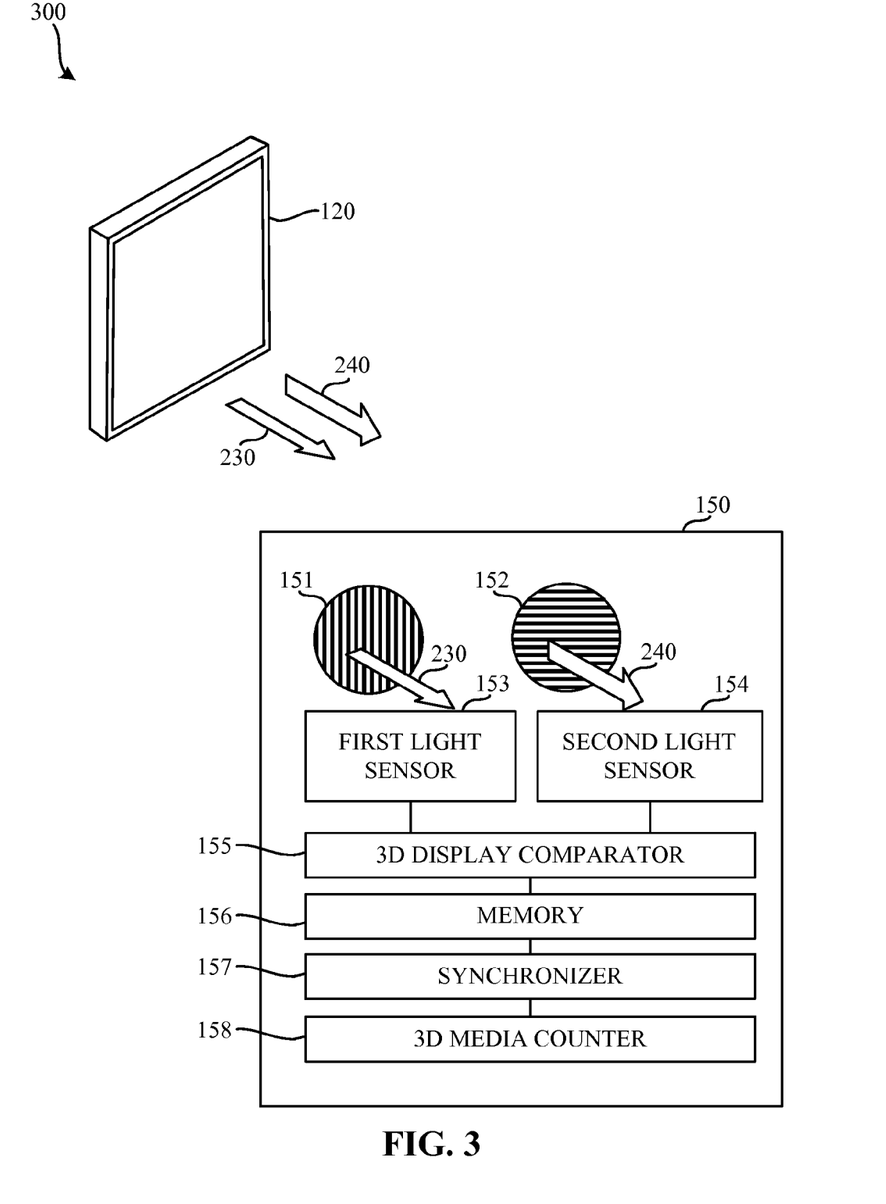
FIG. 3 is a diagram of an example 3D display sensor that may be used in the example system of FIG. 1.

FIG. 3 is a diagram of an example implementation of the 3D display sensor 150 of FIG. 1. The example 3D display sensor 150 includes the first aperture 151, the second aperture 152, a first light sensor 153, a second light sensor 154, a 3D display comparator 155, a memory 156, and a synchronizer 157.

The first aperture 151 of the illustrated example includes a first polarized lens. The second aperture 152 includes a second polarized lens. The polarization of the first lens is perpendicular to the polarization of the second lens. When two alternating perpendicularly polarized images 230 and 240 are displayed by the 3D television 120 (e.g., when 3D media is being displayed), the first polarized image 230 passes through the first aperture 151, but not through the second aperture 152. Likewise, the second polarized image 240 passes through the second aperture 152, but not through the first aperture 151. The first polarized image 230 is received by the first light sensor 153 and the second polarized image 240 is received by the second light sensor 154. As such, when the first polarized image 230 is displayed, the brightness of the light incident upon the first light sensor 153 is typically greater than the brightness of the light incident upon the second light sensor 154. Conversely, when the second polarized image 240 is displayed, the brightness of the light incident upon the second light sensor 154 is typically greater than the brightness of the light incident upon the first light sensor 153. When the 3D television 120 displays 2D media, both the polarized image sensor 153 and the perpendicularly polarized image sensor 154 receive approximately the same brightness.

In the illustrated example, the first light sensor 153 and the second light sensor 154 are light detectors that receive light and output a value indicative of the brightness of the light incident upon the sensor(s). Additionally or alternatively, the first light sensor 153 and the second light sensor 154 may be any other type of brightness detector such as, for example, a light dependent resistor cell (LDR), a photodiode, a phototransistor, an image sensor such as a charge-coupled device (CCD) sensor, a complementary metal-oxide-semiconductor (CMOS) sensor, etc.

The 3D display comparator 155 of the example of FIG. 3 is implemented by a processor executing instructions, but it could alternatively be implemented by an analog circuit, an application specific integrated circuit(s) (ASIC(s)), programmable logic device(s) (PLD(s)) and/or field programmable logic device(s) (FPLD(s)), or other circuitry. In the illustrated example, the 3D display comparator 155 receives a first input from the first light sensor 153 and a second input from the second light sensor 154. The first and second inputs represent respective levels of brightness received by the first light sensor 153 and the second light sensor 154. The 3D display comparator 155 outputs an indication of whether 3D media is being displayed to the metering device 145. The 3D display comparator 155 determines that 3D media is being displayed by the 3D television 120 by successively comparing the brightness levels of the first light sensor 153 and the second light sensor 154. Because the brightness levels will alternate when 3D media is being presented, the 3D display comparator 155 identifies the media as 3D media if the sensor with the greater brightness level alternates between the first light sensor 153 and the second light sensor 154. Additionally or alternatively, the 3D display comparator 155 may determine if the brightness values differ by more than a given value to, for example, prevent media from being identified as 3D media due to changes in ambient light levels near the 3D television 120 (e.g., to prevent a false positive). Further, the 3D display comparator 155 may determine if the sensor having the greater brightness level alternates between the first light sensor 153 and the second light sensor 154 at a given rate such as, for example, a rate that approximates the refresh rate of a passive 3D television (e.g., sixty frames per second, one hundred and twenty frames per second, etc.).

The example memory 156 of the illustrated example of FIG. 3 may be implemented by any device for storing data such as, for example, flash memory, magnetic media, optical media, etc. Furthermore, the data stored in the memory 156 may be in any data format such as, for example, binary data, comma delimited data, tab delimited data, structured query language (SQL) structures, etc. In the illustrated example, the memory 156 stores previous brightness levels received at the first light sensor 153 and/or the second light sensor 154. Additionally or alternatively, the memory 156 may store other information such as, for example, an indication of which light sensor received a greater level of brightness at a particular time, an indication of the refresh rate of the 3D television 120, etc.

Figure 4:
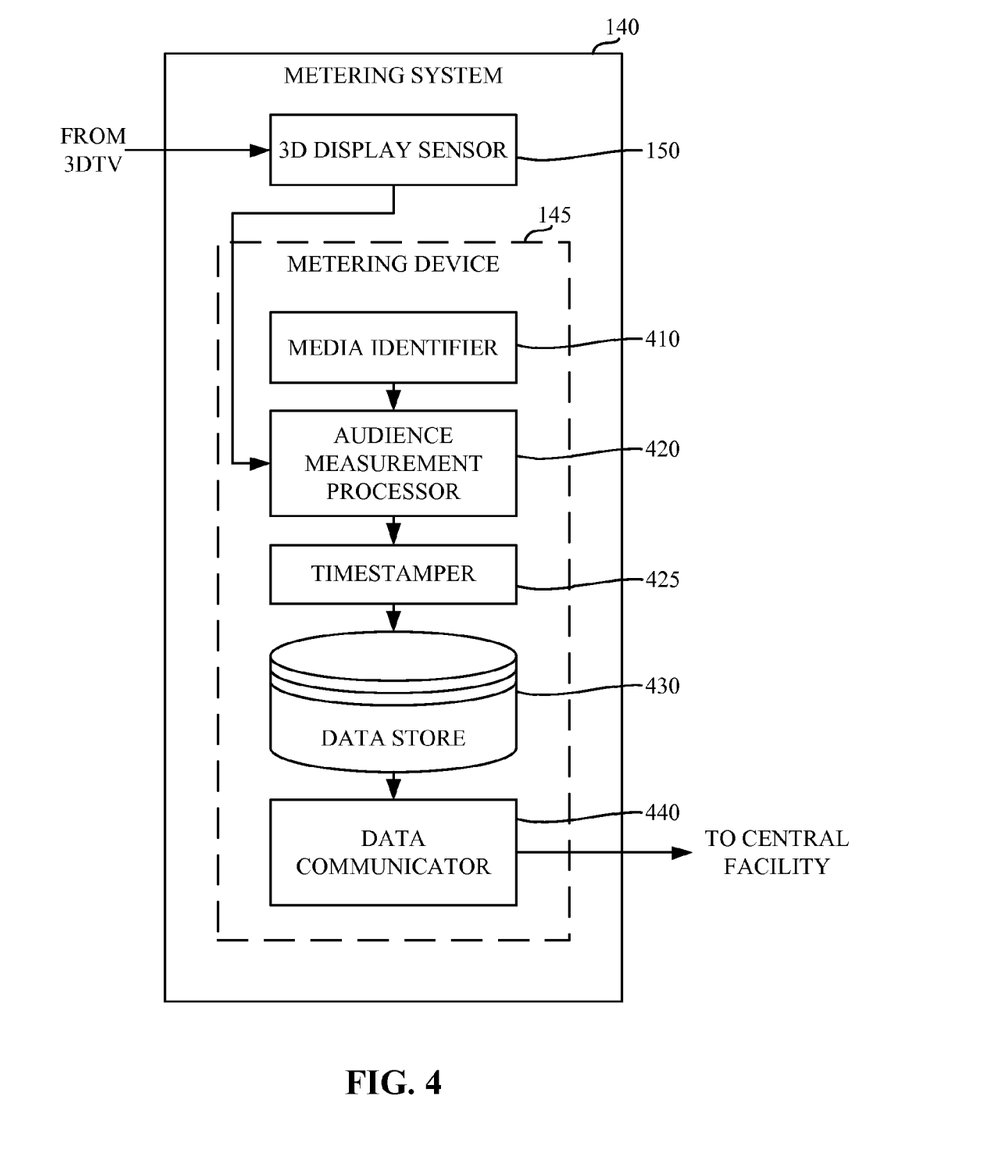
FIG. 4 is a block diagram of an example 3D television monitoring system that may be used in the example system of FIG. 1.

The example synchronizer 157 of the illustrated example of FIG. 3 is implemented by a processor executing instructions, but it could alternatively be implemented by an analog circuit, an application specific integrated circuit(s) (ASIC(s)), programmable logic device(s) (PLD(s)) and/or field programmable logic device(s) (FPLD(s)), or other circuitry. In the example of FIG. 4, the synchronizer 157 synchronizes the brightness level comparisons performed by the 3D display comparator 155 by, for example, causing the 3D display comparator 155 to wait until the next refresh of the 3D television 120. In the illustrated example, the synchronizer 157 causes the 3D display comparator 155 to wait by causing a sampling delay based on a refresh rate of the 3D television 120 (e.g., one sixtieth of a second, etc.). However, in some examples, the synchronizer 157 synchronizes with the refresh rate of the 3D television by, for example, monitoring brightness levels received by the first and/or second light sensors 153 and/or 154.

The example 3D media counter 158 of the illustrated example of FIG. 3 may be implemented by any device for storing data such as, for example, flash memory, magnetic media, optical media, etc. Furthermore, the data stored in the 3D media counter 158 may be in any data format such as, for example, binary data, comma delimited data, tab delimited data, structured query language (SQL) structures, etc. In the illustrated example, the 3D media counter 158 stores a count indicating a number of detected alternations of polarization. While in the illustrated example, the 3D media counter 158 stores a digital count representing the number of detected alternations of polarization, the 3D media counter 158 may store an analog representation of the number of detected alternations of polarization.

FIG. 4 is a block diagram of an example implementation of the example monitoring system 140 FIG. 1. The example monitoring system 140 of FIG. 4 includes the 3D display sensor 150 and the metering device 145. In the illustrated example, the 3D display sensor 150 is smaller and more portable than the metering device 145. In the illustrated example, the 3D display sensor 150 is electrically coupled to the metering device 145 (e.g., via a cable). However, the 3D display sensor 150 may be wirelessly coupled to the metering device 145 and may wirelessly transmit the indication of whether 3D media is being displayed. Further, in the illustrated example, the 3D display sensor 150 is shown as a device that is external to the metering device 145. Having an external 3D display sensor may be advantageous because, for example, the 3D display sensor 130 might only be provided to panelists that have a 3D television 120, the 3D display sensor 130 needs a line of sight such that placement of a small external device (i.e., the 3D display sensor 150) is more convenient than placement of the metering device 145 in an appropriate location, etc. However, in some examples, the 3D display sensor 150 may be a part of and/or integrated into the metering device 145.

The example metering device 145 of the illustrated example of FIG. 4 includes a media identifier 410, an audience measurement processor 420, a timestamper 425, a data store 330, and a data communicator 340.

The example media identifier 410 of the illustrated example of FIG. 4 is implemented by a processor executing instructions, but it could alternatively be implemented by an application specific integrated circuit(s) (ASIC(s)), programmable logic device(s) (PLD(s)) and/or field programmable logic device(s) (FPLD(s)), or other analog and/or digital circuitry. In the example of FIG. 4, the media identifier 410 is used to extract and/or analyze codes and/or signatures from data and/or signals collected by and/or input to the media identifier 110 in another manner (e.g., free field audio detected by the media identifier 410 with a microphone exposed to ambient sound).

Identification codes, such as watermarks, ancillary codes, etc. may be embedded within and/or otherwise transmitted with media signals. Identification codes are data that are inserted into media (e.g., audio) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of some characteristic of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety.

The audience measurement processor 420 of the illustrated example of FIG. 4 is implemented by a processor executing instructions, but could alternatively be implemented by an ASIC, DSP, FPGA, or other analog and/or digital circuitry. The media identifier 410 and the audience measurement processor 420 may be implemented by the same physical processor. In the illustrated example of FIG. 4, the audience measurement processor 420 receives media identifications from the media identifier 410 and an indication of whether media is being displayed in 3D from the 3D display sensor. The audience measurement processor 420 then stores the media identification and the identification of whether the media is displayed in 3D in the data store 430.

The timestamper 425 of the illustrated example of FIG. 4 is implemented by a processor executing instructions, but could alternatively be implemented by an ASIC, DSP, FPGA, or other analog and/or digital circuitry. The media identifier 410, the audience measurement processor 420, and the timestamper 425 may be implemented by the same physical processor. In the illustrated example of FIG. 4, the timestamper 425 timestamps media identifications stored in the data store 430 by the audience measurement processor 420. Timestamping (e.g., recording a time that an event occurred) enables accurate identification and/or correlation of media that was presented and/or the time that it was presented.

The data store 430 of the illustrated example of FIG. 4 may be implemented by any device for storing data such as, for example, flash memory, magnetic media, optical media, etc. Furthermore, the data stored in the data store 430 may be in any data format such as, for example, binary data, comma delimited data, tab delimited data, structured query language (SQL) structures, etc. While in the illustrated example the data store 430 is illustrated as a single database, the data store 430 may be implemented by any number and/or type(s) of databases.

The data communicator 440 of the illustrated example of FIG. 4 is implemented by an Ethernet interface. In the illustrated example, the data communicator 440 transmits data stored in the data store 430 to the central facility 160 via, for example, the Internet. While in the illustrated example, the data communicator 440 is an Ethernet interface, any other type(s) of interface may additionally or alternatively be used. For example, the data communicator 440 might include one or more of a Bluetooth interface, a WiFi interface, a digital subscriber line (DSL) interface, a T1 interface, etc. While in the illustrated example a single data communicator 440 is shown, any number and/or type(s) of data communicators may additionally or alternatively be used.

While an example manner of implementing the metering system 140 of FIG. 1 has been illustrated in FIGS. 3 and/or 4, one or more of the elements, processes and/or devices illustrated in FIGS. 3 and/or 4 may be combined, divided, rearranged, omitted, eliminated and/or implemented in any other way. Further, the example 3D display sensor 150, the example first light sensor 153, the example second light sensor 154, the example 3D display comparator 155, the example memory 156, the example synchronizer 157, the example 3D media counter 158, the example metering device 145, the example media identifier 410, the example audience measurement processor 420, the example timestamper 425, the example data store 430, the example data communicator 440, and/or more generally the example metering system 140 of FIGS. 3 and/or 4 may be implemented by hardware, software, firmware and/or any combination of hardware, software and/or firmware. Thus, for example, any of the example 3D display sensor 150, the example first light sensor 153, the example second light sensor 154, the example 3D display comparator 155, the example memory 156, the example synchronizer 157, the example 3D media counter 158, the example metering device 145, the example media identifier 410, the example audience measurement processor 420, the example timestamper 425, the example data store 430, the example data communicator 440, and/or more generally the example metering system 140 of FIGS. 3 and/or 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example 3D display sensor 150, the example first light sensor 153, the example second light sensor 154, the example 3D display comparator 155, the example memory 156, the example synchronizer 157, the example 3D media counter 158, the example metering device 145, the example media identifier 410, the example audience measurement processor 420, the example timestamper 425, the example data store 430, and/or the example data communicator 440 of FIGS. 3 and/or 4 are hereby expressly defined to include a tangible computer readable medium such as a memory, DVD, CD, Blu-ray, etc. storing the software and/or firmware. Further still, the example 3D display sensor 150, the example first light sensor 153, the example second light sensor 154, the example 3D display comparator 155, the example memory 156, the example synchronizer 157, the example 3D media counter 158, the example metering device 145, the example media identifier 410, the example audience measurement processor 420, the example timestamper 425, the example data store 430, and/or the example data communicator 440 of FIGS. 3 and/or 4, and/or may include more than one of any or all of the illustrated elements, processes and devices.

Although beyond the scope of this disclosure, it is noted that the system 140 of FIG. 1 will typically be provided with a people meter to identify individuals in the monitored audience. Identifying the individuals in the audience allows mapping of their demographics to the media. Panelists provide their demographic information when they agree to be monitored by the audience measurement system. Any method of people metering may be employed. For example, the people metering may be active in that it requires panelists to periodically self-identify by, for instance, entering an identifier corresponding to their name, or it may be passive in that electronics (e.g., video cameras) may be used to identify and/or count persons in the audience. See U.S. Pat. No. 7,609,853, which is hereby incorporated by reference herein in its entirety for an example people metering solution.

Flowcharts representative of example machine-readable instructions for implementing the metering system 140 of FIGS. 1 and/or 4 are shown in FIGS. 5, 6A, 6B, 7, and/or 8. In these examples, the machine-readable instructions comprise a program(s) for execution by a processor such as the processor 912 shown in the example processor platform 900 discussed below in connection with FIG. 9. The program may be embodied in software stored on a tangible computer readable medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5, 6A, 6B, 7, and/or 8, many other methods of implementing the example metering system 140 may alternatively be used. For example, the order of execution of the blocks may be changed, and/or some of the blocks described may be changed, eliminated, or combined.

As mentioned above, the example processes of FIGS. 5, 6A, 6B, 7, and/or 8 may be implemented using coded instructions (e.g., machine-readable instructions) stored on a tangible machine-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible machine-readable medium is expressly defined to include any type of machine-readable storage and to exclude propagating signals. Additionally or alternatively, the example processes of FIGS. 5, 6A, 6B, 7, and/or 8 may be implemented using coded instructions (e.g., machine-readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 5:
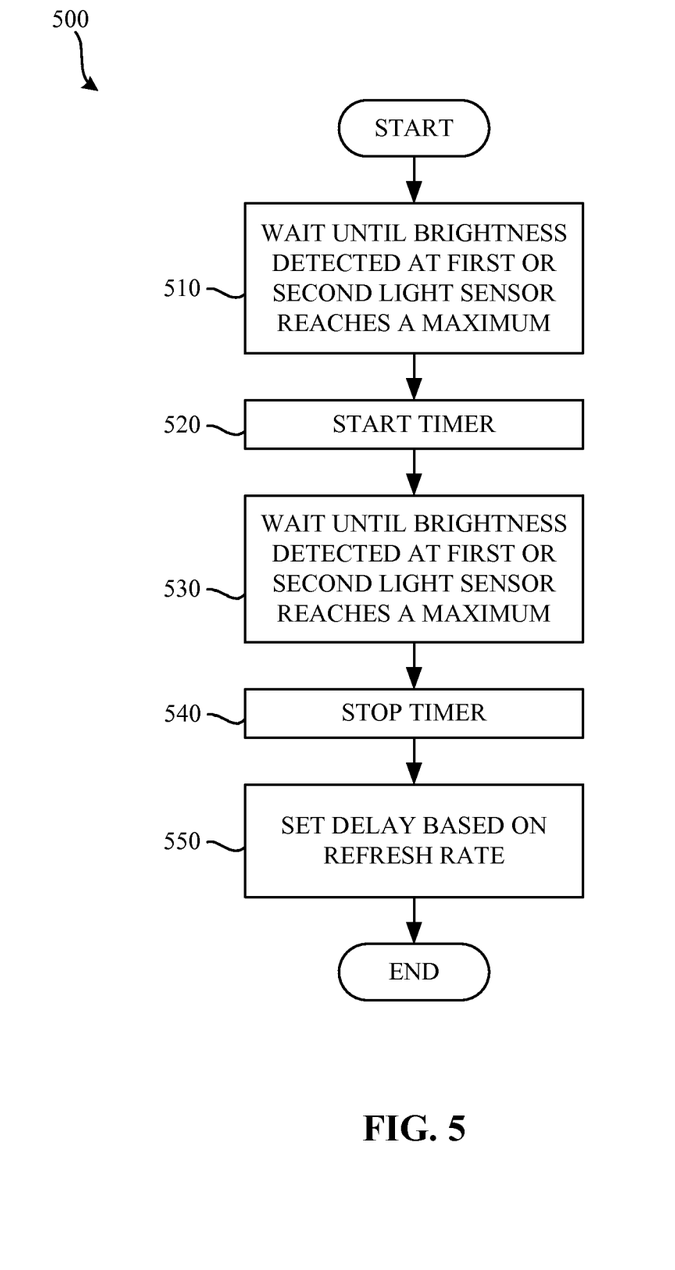
FIG. 5 is a flowchart representative of example machine-readable instructions which may be executed to implement the example 3D display detector of FIGS. 1 and/or 3 to detect a refresh rate of the passive 3D television.

FIG. 5 is a flowchart representative of example machine-readable instructions 500 which may be executed to implement the example 3D display detector of FIGS. 1 and/or 3 to detect a refresh rate of the passive 3D television 120. Because televisions present media by refreshing the display at an interval, it is important to sample the brightness levels at times when the brightness levels are maximized (e.g., between a refresh operation). For example, sampling the detected brightness between refreshes may reduce the difference between the first and second brightness levels. When the difference between the first and second brightness levels is low, it is more difficult to accurately detect 3D media presentations. To maximize the difference in detected brightness levels, the synchronizer 157 causes the 3D display comparator 155 to wait until an expected refresh of the 3D television 120 and sample after such refresh is expected to be completed.

Because different 3D televisions 120 may refresh at different rates (e.g., 50 Hz, 60 Hz, 120 Hz, 240 Hz, 480 Hz, 600 Hz, etc.) and further because some 3D televisions 120 may alter the refresh rate used for displaying media from different sources, the synchronizer 157 detects the refresh rate of the 3D television 120. In some examples, the synchronizer receives an input from a user or an installer (e.g., coming from the audience measurement entity) (e.g., via a switch or series of switches, via an interface, etc.) that specifies a refresh rate for the 3D television 120.

The example machine-readable instructions 500 of FIG. 5 begin execution at block 510 when the synchronizer 157 waits until a brightness detected at the first light sensor 153 or the second light sensor 154 reaches a maximum (block 510). The maximum may be detected by, for example detecting a zero-crossing of a first differentiated brightness level of the first light sensor 153 and/or a zero-crossing of a second differentiated brightness level of the second light sensor 154. Further, because a zero-crossing of the differentiated brightness levels might be detected when light levels are constant, the synchronizer may additionally compare the detected brightness levels to determine if the brightness levels are above a threshold. In the illustrated example, the synchronizer 157 starts a timer (block 520). The synchronizer 157 waits until the brightness detected at the first light sensor 153 or the second light sensor 154 reaches another maximum (block 530). The synchronizer 157 then stops the timer (block 540). An expected refresh delay is then stored in the memory 156 by the synchronizer 157 (block 550).

While in the illustrated example, the synchronizer 157 detects maximum brightness levels of the first light sensor 153 and the second light sensor 154, the synchronizer 157 may detect the maximum brightness level via one of the first light sensor 153 and the second light sensor 154. If, for instance, the synchronizer 157 detects the maximum brightness level via one of the first light sensor 153 and the second light sensor 154, the synchronizer 157 may modify the expected refresh delay by dividing by two.

Figure 6A:
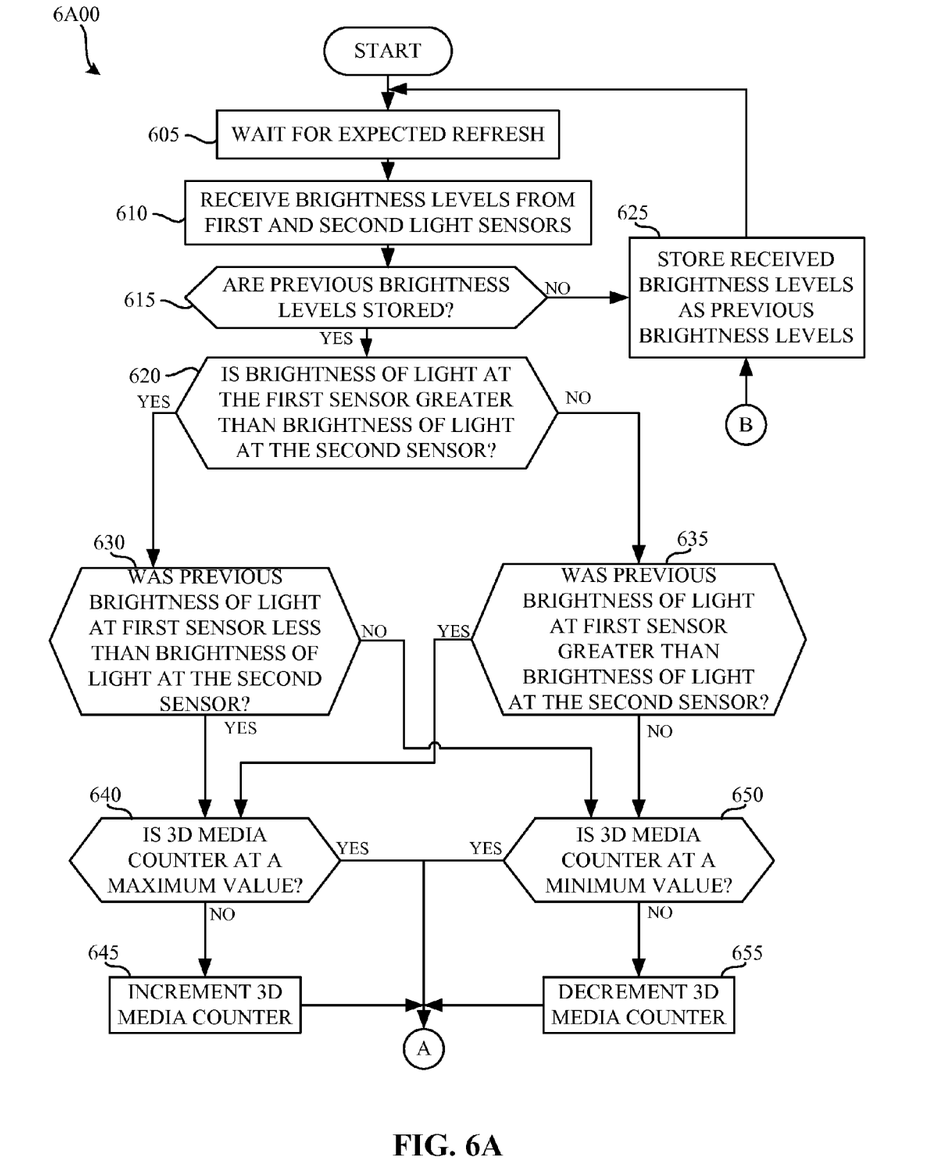
FIGS. 6A and 6B are flowcharts representative of example machine-readable instructions which may be executed to implement the example 3D display detector of FIGS. 1 and/or 3 to identify exposure to 3D media presentations.
Figure 6B:
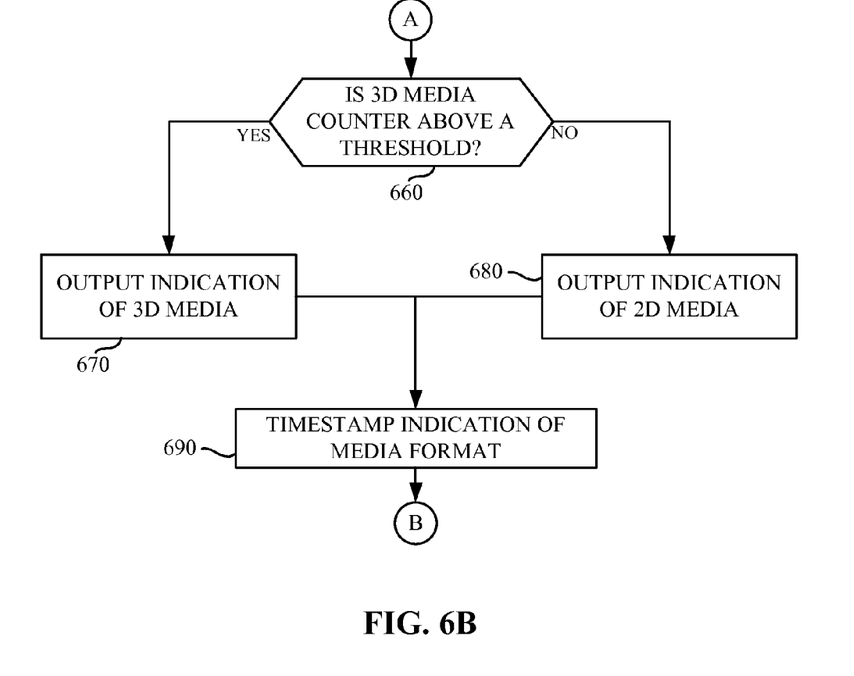

FIGS. 6A and 6B are flowcharts representative of example machine-readable instructions 600 which may be executed to implement the example 3D display detector of FIGS. 1 and/or 3 to identify when media is being displayed in 3D. The example machine-readable instructions 600 of FIGS. 6A and 6B begin execution at block 605 when the synchronizer 157 waits for the expected refresh of the display of the 3D television 120 (block 605). For example, if the 3D television has a refresh rate of one hundred and twenty hertz, a new frame will be displayed every one hundred and twentieth of a second. Additionally or alternatively, any other refresh rate may be used. By waiting for the expected refresh, brightness levels at the first light sensor 153 and the second light sensor 154 are only sampled when the 3D television 120 is expected to refresh. When the 3D television 120 refreshes, only a single image having one polarization is displayed. Thus, when the 3D television refreshes when displaying 3D media, the difference in brightness levels received at the first and second light sensors 153, 154, is maximized as only one lens is expected to pass significant light.

The 3D display comparator 155 then receives brightness levels from the first sensor 153 and the second sensor 154 (block 610). The 3D display comparator 155 determines whether previous brightness levels of the first sensor 153 and the second sensor 154 are stored, for example, in the memory 156 (block 615). Previous brightness levels are used to determine if the polarization of successive frames displayed by the 3D television are perpendicularly alternating. If previous brightness levels are not stored in the memory 156, the 3D display comparator 155 stores the received brightness levels as the previous brightness levels (block 625) and proceeds to wait for the next expected refresh of the 3D television 120 (block 605).

A number of brightness level comparisons are performed by the 3D display comparator 155. In the illustrated example, it is assumed that the brightness levels of the first and second sensors 153, 154 are not equal, and thus, greater than and/or less than comparisons will not be comparing equal values. However, in some examples, the 3D display comparator 155 may determine if the brightness levels differ by more than a given amount (e.g., ten percent, twenty percent, etc.). If, for example, the brightness levels do not differ by more than the given amount, it may be determined that the media is not being displayed in 3D (e.g., the media is being displayed in 2D).

If previous brightness levels are stored (block 615), the 3D display comparator 155 performs a comparison to determine if a current brightness of light incident at the first sensor 153 is greater than a current brightness of light incident at the second sensor 154 (block 620).

If the current brightness of light incident at the first sensor 153 is greater than the current brightness of light incident at the second sensor 154 control proceeds to block 630. The 3D display comparator 155 retrieves the previous brightness levels from the memory 156 and performs a comparison to determine if the previous brightness of light incident at the first sensor 153 was less than the previous brightness of light incident at the second sensor 154 (block 630). Alternatively, a result of the previous comparison may be stored in the memory 156, and the comparison may include retrieving the result of the previous comparison. If the previous brightness of light incident at the first sensor 153 was less than the previous brightness of light incident at the second sensor 154, then the comparator 155 concludes that the brightness levels are alternating. When the brightness levels are alternating, control proceeds to block 640. If the previous brightness of light incident at the first sensor 153 was not less than the previous brightness of light incident at the second sensor 154 (block 630), then the comparator 155 concludes that the brightness levels are not alternating and control proceeds to block 650.

Returning to block 620, if the current brightness of light incident at the first sensor 153 is not greater than the current brightness of light incident at the second sensor 154, control proceeds to block 635. The 3D display comparator 155 retrieves the previous brightness levels from the memory 156 and performs a comparison to determine if the previous brightness of light incident at the first sensor 153 was greater than the previous brightness of light incident at the second sensor 154 (block 635). Alternatively, a result of the previous comparison may be stored in the memory 156, and the comparison may include retrieving the result of the previous comparison. If the previous brightness of light incident at the first sensor 153 was greater than the previous brightness of light incident at the second sensor 154, then the comparator 155 concludes that the brightness levels are alternating. When the brightness levels are alternating, control proceeds to block 640. If the previous brightness of light incident at the first sensor 153 was not greater than the previous brightness of light incident at the second sensor 154, then the comparator 155 concludes that the brightness levels are not alternating. When the brightness levels are not alternating, control proceeds to block 650.

When the brightness levels are alternating, the comparator 155 determines if the 3D media counter 158 is at a maximum level (block 640). When the brightness levels are not alternating, the comparator determines if the 3D media counter 158 is at a minimum level (block 650). The 3D media counter stores a number of recent brightness level alternations. When brightness levels are alternating, the 3D media counter 158 is incremented up to the maximum (block 645). When brightness levels are not alternating, the 3D media counter 158 is decremented down to the minimum (block 655). Using a 3D media counter to store a number of alternations enables the comparator 155 to ignore false readings of non-alternation and to ignore false readings of alternation. For example, the comparator 155 might receive the false reading of non-alternation when the 3D television 120 is changing between different media (e.g., when changing an input source, when changing a channel, etc.). The comparator 155 might receive the false reading of alternation when one of the first and second light sensors 153, 154 are obstructed, when ambient light changes near the 3D display sensor 150, when a received signal experiences interference, etc.

Thus, the 3D display comparator 155 increments the 3D media counter 158 when the first brightness incident at the first sensor 153 is greater than the second brightness and the previous brightness of light incident at the first sensor 153 is less than the previous brightness of light incident at the second sensor 154. Additionally or alternatively, the 3D display comparator 155 increments the 3D media counter 158 when the first brightness incident at the first sensor 153 is less than the second brightness and the previous brightness of light incident at the first sensor 153 is greater than the previous brightness of light incident at the second sensor 154.

In some examples, the 3D display comparator 155 decrements the 3D media counter 158 when the first brightness incident at the first sensor 153 is greater than the second brightness and the previous brightness of light incident at the first sensor 153 is greater than the previous brightness of light incident at the second sensor 154. Additionally or alternatively, the 3D display comparator 155 decrements the 3D media counter 158 when the first brightness incident at the first sensor 153 is less than the second brightness and the previous brightness of light incident at the first sensor 153 is less than the previous brightness of light incident at the second sensor 154.

The 3D display comparator 155 then compares the 3D media counter 158 to a threshold. If the 3D media counter 158 is above the threshold, the comparator 155 outputs an indication of 3D media (block 670). If the 3D media counter 158 is not above the threshold, the comparator 155 outputs an indication of 2D media (block 680). In the illustrated example, the threshold is a count representing an amount of time where the display must be alternating between the two different polarizations to be considered to be presenting 3D media. For example, the threshold may represent a time of two seconds where the display is alternating. In some examples, the threshold is based on the refresh rate. For example, an example threshold may be sixty alternating frames. When the refresh rate is sixty Hz, the example threshold represents one second. However, when the refresh rate is increased to two hundred and forty Hz, the example threshold represents one quarter of a second. Thus, in some examples, the threshold is increased and/or decreased to represent a time limit sufficient to make a confident 3D versus 2D determination. In some examples, the threshold may be related to the maximum and minimum value of the 3D media counter 158. For example, the 3D media counter 158 may have a maximum of one hundred and twenty, representing two seconds for a sixty Hz display. The threshold may be sixty, representing one second for the same display. Thus, the media is classified as 3D media after one second of alternating frames are detected. When 3D media has been displayed for more than two seconds (i.e., the 3D counter is at its maximum value), 2D media will be detected upon one second of non-alternating frames (i.e., after the 3D counter has been sufficiently decremented). In the illustrated example, the threshold is an average of the maximum and the minimum. However, any other value may be used.

Once the 3D display comparator 155 outputs the indication of media format, the indication is timestamped by the comparator 155 to facilitate correlation with the display media identifier (block 690). In the illustrated example, the indication of media format is immediately transmitted (e.g., streamed) to the metering device 145. However, in some examples, the indication of media format is stored, cached, and/or buffered in the memory 156 before being transmitted to the metering device 145. The 3D display comparator 155 then stores the current received brightness levels as the previous brightness levels (block 625).

While in the illustrated example one 3D media counter 158 is used to identify when 3D media is being presented, in some examples more than one counter may be used. For example, the 3D media counter 158 may store an indication of alternating polarizations and a 2D media counter may store an indication of non-alternating polarizations. If, for example, the 3D media counter 158 is above a 3D display threshold, the 2D media counter may be reset (e.g., zeroed). If, for example, the 2D media counter is above a 2D display threshold (e.g., more than a given number of non-alternating polarizations have been detected), the 3D media counter 158 may be reset.

Figure 7:
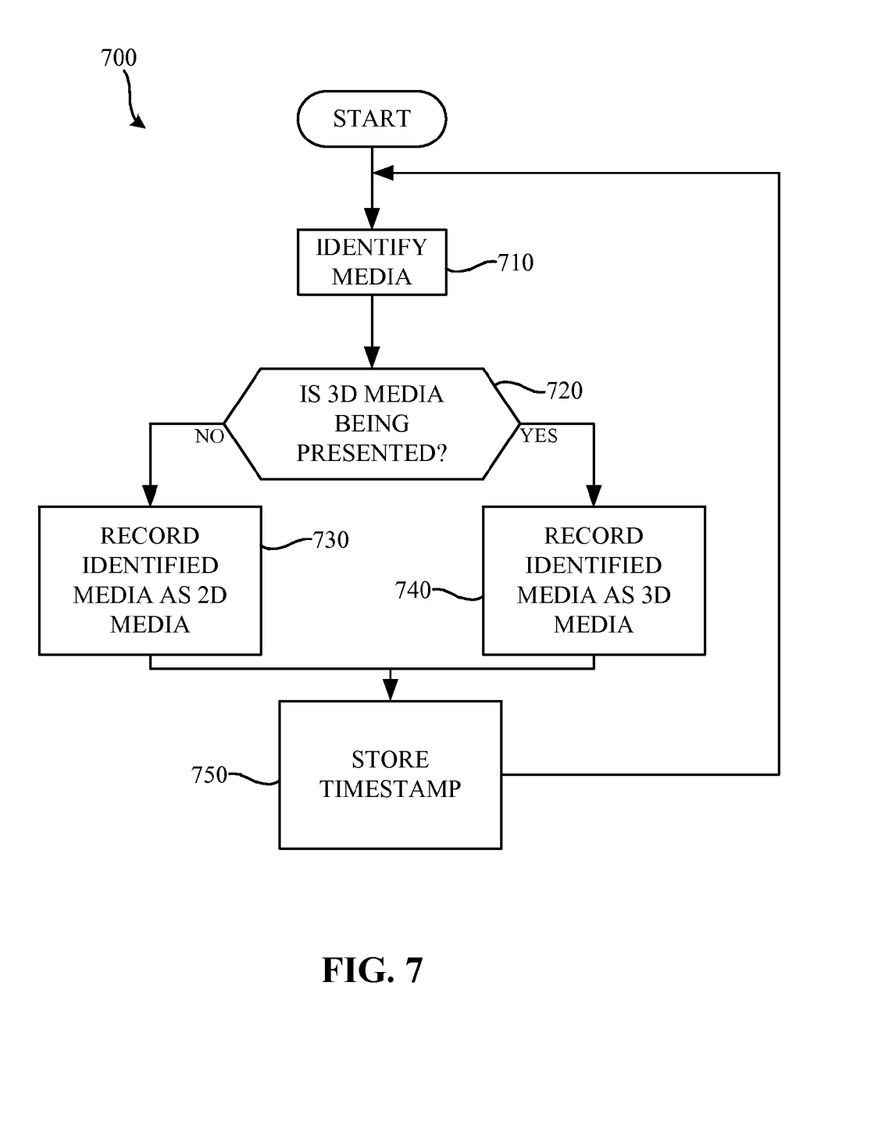
FIG. 7 is a flowchart representative of example machine-readable instructions which may be executed to implement the example 3D television monitoring system of FIGS. 1 and/or 4 to identify exposure to 3D media presentations.

FIG. 7 is a flowchart representative of example machine-readable instructions 700 which may be executed to implement the example 3D television metering system 140 of FIGS. 1 and/or 4 to identify when media is being displayed in 3D. The example machine-readable instructions 700 of FIG. 7 begin execution at block 710 when the media identifier 410 identifies media displayed via the 3D television 120 (block 710). As mentioned above, the media can be identified in any number of ways. For example, it can be identified locally by the media identifier and/or identified at the central facility 160 based on the stored identification data collected by the media identifier. The method of media identification is not material to this patent and will not be discussed further herein.

The audience measurement processor 420 receives an indication of whether media is presented in 3D from the 3D display sensor 150 and determines whether the indication indicates that 3D media is being presented (block 720). If the media is being presented in 3D, the audience measurement processor 420 records the identified media as being presented in 3D (block 740). The timestamper 425 stores a timestamp of the time of the presentation of the media (block 750). While in the illustrated example, the timestamp represents a time that the media was presented, the timestamp may additionally or alternatively represent any other event such as, for example, a time that the media was identified, a time that it was determined that the media was presented in 3D, etc. If the media is not being presented in 3D (i.e., the media is being presented in 2D), the audience measurement processor 420 records the identified media as being presented in 2D (block 730). The timestamper 425 stores a timestamp of the time of the presentation of the media (block 650). Control proceeds to repeat the process of FIG. 7 to identify additional media and determine whether the identified media is displayed in 3D or 2D.

Figure 8:
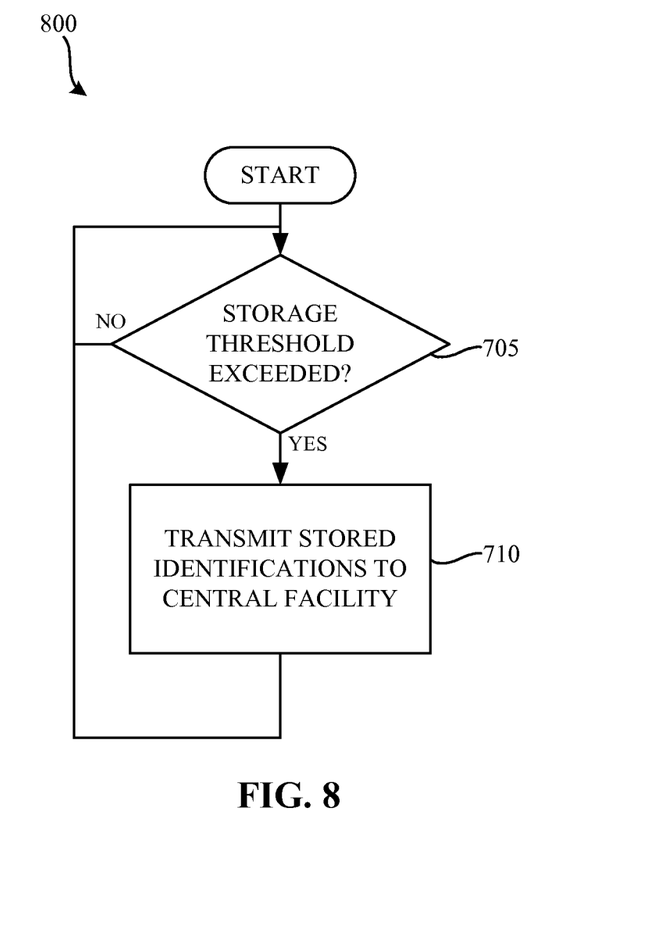
FIG. 8 is a flowchart representative of example machine-readable instructions which may be executed to implement the example 3D television monitoring system of FIGS. 1 and/or 4 to transmit a record of identified media and its presentation format to the example central facility of FIG. 1.

FIG. 8 is a flowchart representative of example machine-readable instructions 800 which may be executed to implement the example 3D television metering system 140 of FIGS. 1 and/or 4 to transmit a record of identified media and its presentation format to the example central facility 160 of FIG. 1. The machine-readable instructions 800 of FIG. 8 begin execution at block 805 when the data communicator 440 determines whether a storage threshold has been exceeded (block 805). In the illustrated example, the threshold is a time limit specifying that network communications are transmitted once every day. Additionally or alternatively, any other periodic and/or aperiodic approach to triggering transmission of data from the metering system 140 may be used. For example, the storage threshold might be based on an amount of records of identified media stored in the data store 430 (e.g., ten megabytes of records, one hundred records, etc.).

If the storage threshold has not been exceeded (block 805) the data transmitter 440 waits until the storage threshold has been exceeded. When the storage threshold has been exceeded (block 805), the data transmitter 440 transmits the stored records of identified media (e.g., data that can be used to identify the media and/or the name of the identified media, etc.) to the central facility 160. In the illustrated example, the data transmitter 440 transmits the stored records via the Internet. However, in some examples, the data transmitter 440 transmits the stored records via a cellular telecommunication connection, via the plain old telephone system (POTS), or via a local connection such as, for example, a serial connection, a universal serial bus (USB) connection, a Bluetooth connection, etc. When the data transmitter 440 transmits via the local connection, the metering system 140 and/or the metering device 145 may be physically moved to a location of the central facility 160 by, for example, physically mailing the metering system 140 and/or the metering device 145, etc. to facilitate data extraction from the same.

Figure 9:
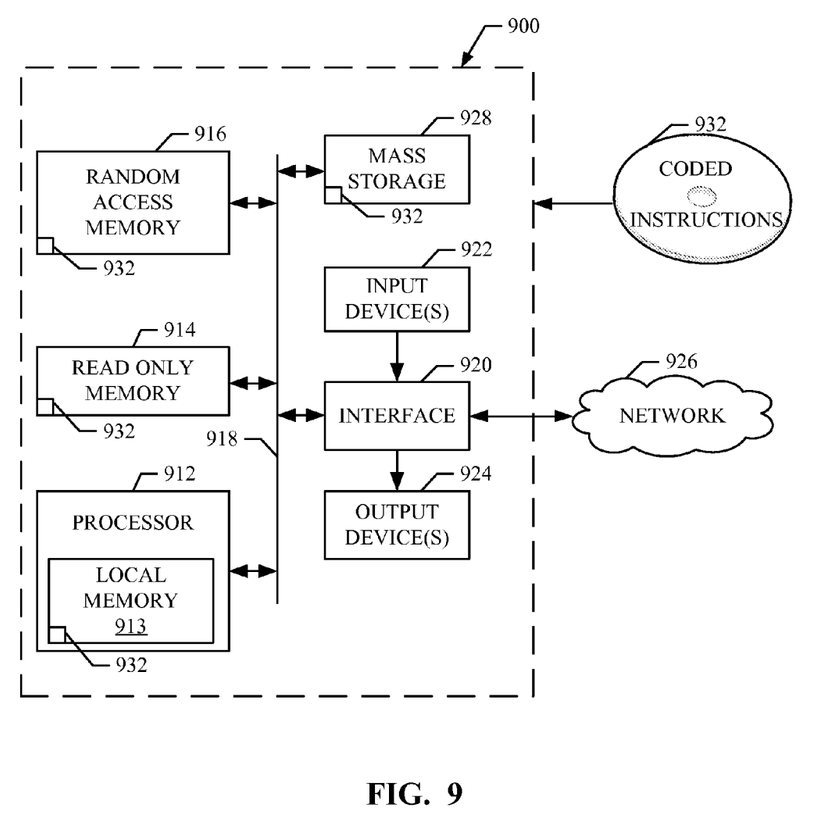
FIG. 9 is a block diagram of an example processor platform capable of executing the example machine-readable instructions of FIGS. 5, 6A, 6B and/or 7 to implement the example 3D television monitoring system of FIGS. 1, 3, and/or 4.

FIG. 9 is a block diagram of an example processor platform 900 capable of executing the example machine-readable instructions of FIGS. 5, 6A, 6B, 7, and/or 8 to implement the example 3D television monitoring system 140 of FIGS. 1, 3, and/or 4. The processor platform 900 can be, for example, a server, a personal computer, an Internet appliance, a DVD player, a CD player, a digital video recorder, a Blu-ray player, a gaming console, a personal video recorder, a set top box, or any other type of computing device.

The system 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The computer 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, an infrared remote and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device (e.g., the data communicator 440) such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement the data store 430.

The coded instructions 932 of FIGS. 5, 6, 7, and/or 8 may be stored in the mass storage device 928, in the volatile memory 914, in the non-volatile memory 916, in the local memory 913, and/or on a removable storage medium such as a CD or DVD.

From the foregoing, it will be appreciated that the above disclosed methods, apparatus and articles of manufacture enable identification of exposure to passive 3D media presentations.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method of detecting a presentation format of media, the method comprising:
    detecting a first brightness level with a first sensor and a second brightness level with a second sensor at a first time;
    detecting a third brightness level with the first sensor and a fourth brightness level with the second sensor at a second time later than the first time; and
    incrementing a 3D media counter when either:
        the first brightness is greater than the second brightness and the third brightness is less than the fourth brightness, or
        the first brightness is less than the second brightness and the third brightness is greater than the fourth brightness; and
    identifying the media as 3D media when the 3D media counter exceeds a threshold.

2. The method as defined in claim 1, further comprising decrementing the 3D media counter when the first brightness is greater than the second brightness and the third brightness is greater than the fourth brightness.

3. The method as defined in claim 2, further comprising decrementing the 3D media counter when the first brightness is less than the second brightness and the third brightness is less than the fourth brightness.

4. The method as defined in claim 3, further comprising identifying the media as 2D media if the 3D media counter is less than a threshold.

5. The method as described in claim 1, wherein the first light sensor receives light via a first polarized filter and the second light sensor receives light via a second polarized filter, the second filter being perpendicularly polarized with respect to the first filter.

6. The method as described in claim 1, wherein a count in the 3D media counter represents an amount of time that alternating brightness is detected.

7. The method as described in claim 1, wherein the 3D media counter is incremented only when the 3D media counter is below a maximum value.

8. An apparatus to identify a format of media, the apparatus comprising:
    a first light sensor to detect a first brightness level through a first polarized lens;
    a second light sensor to detect a second brightness level through a second polarized lens, the second lens being perpendicularly polarized with respect to the first lens; and
    a comparator to identify the media as 3D media if the first and second brightness levels correspond to a repeating, alternating pattern in which the first brightness level is greater than the second brightness level at a first time and the second brightness level is greater than the first brightness level at a second time later than the first time.

9. The apparatus as described in claim 8, further comprising a memory to store the first brightness level and the second brightness level.

10. The apparatus as described in claim 8, further comprising a synchronizer to cause the first and second light sensors to sample in coordination with a refresh of a display.

11. The apparatus as described in claim 8, wherein the synchronizer synchronizes to a refresh rate of the display.

12. A tangible machine-readable storage device or storage disk comprising instructions which, when executed, cause a machine to at least:
    detect a first brightness level with a first sensor and a second brightness level with a second sensor at a first time;
    detect a third brightness level with the first sensor and a fourth brightness level with the second sensor at a second time later than the first time; and
    increment a 3D media counter when either:
        the first brightness is greater than the second brightness and the third brightness is less than the fourth brightness, or
        the first brightness is less than the second brightness and the third brightness is greater than the fourth brightness; and
    identify the media as 3D media when the 3D media counter exceeds a threshold.

13. The machine-readable device or storage disk as described in claim 12, further comprising instructions to cause the machine to decrement the 3D media counter when the first brightness is greater than the second brightness and the third brightness is greater than the fourth brightness.

14. The machine-readable device or storage disk as described in claim 13, further comprising instructions to cause the machine to decrement the 3D media counter when the first brightness is less than the second brightness and the third brightness is less than the fourth brightness.

15. The machine-readable device or storage disk as described in claim 14, wherein a difference between the first time and the second time is based on a refresh rate of a display.

16. The machine-readable device or storage disk as described in claim 15, further comprising instructions to cause the machine to determine the refresh rate of the display.

17. The machine-readable device or storage disk as described in claim 12, wherein the instructions further cause the machine to determine whether the first brightness and the second brightness differ by more than a given amount.

18. The machine-readable device or storage disk as described in claim 12, wherein the first light sensor receives light via a first polarized filter and the second light sensor receives light via a second polarized filter, the second filter being perpendicularly polarized with respect to the first filter.

19. The machine-readable device or storage disk as described in claim 12, further comprising instructions to cause the machine to identify the media as 2D media if the 3D media counter is less than a threshold.

* * * * *